(12) United States Patent
Salter et al.

(10) Patent No.: US 9,803,822 B1
(45) Date of Patent: Oct. 31, 2017

(54) VEHICLE ILLUMINATION ASSEMBLY

(71) Applicant: Ford Global Technologies, LLC, Dearborn, MI (US)

(72) Inventors: Stuart C. Salter, White Lake, MI (US); Stephen Kenneth Helwig, Farmington Hills, MI (US); Aaron Bradley Johnson, Allen Park, MI (US); Paul Kenneth Dellock, Northville, MI (US); Joseph Myszka, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/172,900

(22) Filed: Jun. 3, 2016

(51) Int. Cl.
 *F21V 1/00* (2006.01)
 *F21S 8/10* (2006.01)

(52) U.S. Cl.
 CPC .......... *F21S 48/14* (2013.01); *F21S 48/1131* (2013.01); *F21S 48/1136* (2013.01); *F21S 48/1394* (2013.01); *F21S 48/21* (2013.01); *F21S 48/238* (2013.01)

(58) Field of Classification Search
 CPC .... F21S 48/1131; F21S 48/1136; F21S 48/12; F21S 48/1208; F21S 48/1225; F21S 48/1233; F21S 48/125; F21S 48/1258; F21S 48/1266; F21S 48/1283; F21S 48/13; F21S 48/1317; F21S 48/1358; F21S 48/1376; F21S 48/1388; F21S 48/1394; F21S 48/14; F21S 48/21; F21S 48/22; F21S 48/23; F21S 48/234; F21S 48/238; F21S 48/24

USPC ........ 362/487, 505–507, 509–510, 520–522, 362/540–545
See application file for complete search history.

(56) References Cited

U.S. PATENT DOCUMENTS

| | | | |
|---|---|---|---|
| 2,486,859 A | 11/1949 | Meijer et al. | |
| 2,713,286 A | 7/1955 | Taylor | |
| 3,637,285 A | 1/1972 | Stewart | |
| 5,008,142 A | 4/1991 | Wilson et al. | |
| 5,053,930 A | 10/1991 | Benavides | |
| 5,483,430 A | 1/1996 | Stapel et al. | |
| 5,709,453 A | 1/1998 | Krent et al. | |
| 5,839,718 A | 11/1998 | Hase et al. | |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Jason Moon Han
(74) *Attorney, Agent, or Firm* — Jason Rogers; Price Heneveld LLP

(57) ABSTRACT

A vehicle reflective assembly is provided herein. The reflective assembly includes a lens and a housing attached to the lens. The lens includes a reflective assembly portion. A base layer having reflective characteristics is disposed on the lens in the reflective assembly portion. A photoluminescent structure is disposed on the base layer and is configured to luminesce in response to receiving an excitation light emitted by a light source. A reflective layer is disposed on the photoluminescent structure and has one or more reflective beads configured to reflect a first portion of incident light directed towards the reflective assembly portion and allow a second portion of the incident light to pass therethrough. The second portion of the incident light includes the excitation light therein.

20 Claims, 7 Drawing Sheets

(56) References Cited

U.S. PATENT DOCUMENTS

| | | |
|---|---|---|
| 6,031,511 A | 2/2000 | DeLuca et al. |
| 6,117,362 A | 9/2000 | Yen et al. |
| 6,419,854 B1 | 7/2002 | Yocom et al. |
| 6,494,490 B1 | 12/2002 | Trantoul |
| 6,577,073 B2 | 6/2003 | Shimizu et al. |
| 6,729,738 B2 | 5/2004 | Fuwausa et al. |
| 6,737,964 B2 | 5/2004 | Samman et al. |
| 6,773,129 B2 | 8/2004 | Anderson, Jr. et al. |
| 6,820,888 B1 | 11/2004 | Griffin |
| 6,851,840 B2 | 2/2005 | Ramamurthy et al. |
| 6,859,148 B2 | 2/2005 | Miller |
| 6,871,986 B2 | 3/2005 | Yamanaka et al. |
| 6,953,536 B2 | 10/2005 | Yen et al. |
| 6,990,922 B2 | 1/2006 | Ichikawa et al. |
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,120,236 B2 | 2/2012 | Auday et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2007/0297045 A1 | 12/2007 | Sakai et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2011/0255298 A1 | 10/2011 | Lindsay et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0077335 A1 | 3/2013 | Murley et al. |
| 2013/0092965 A1 | 4/2013 | Kijima et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2016/0016506 A1 | 1/2016 | Collins et al. |
| 2016/0102819 A1* | 4/2016 | Misawa ............... F21S 48/1145 362/510 |
| 2016/0236613 A1 | 8/2016 | Trier |

FOREIGN PATENT DOCUMENTS

| | | |
|---|---|---|
| CN | 201193011 Y | 2/2009 |
| CN | 102354473 A | 2/2012 |
| CN | 204009126 U | 12/2014 |
| CN | 204127823 U | 1/2015 |
| DE | 4120677 A1 | 1/1992 |
| DE | 29708699 U1 | 7/1997 |
| DE | 10239838 A1 | 3/2004 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014155372 A1 | 10/2014 |

\* cited by examiner

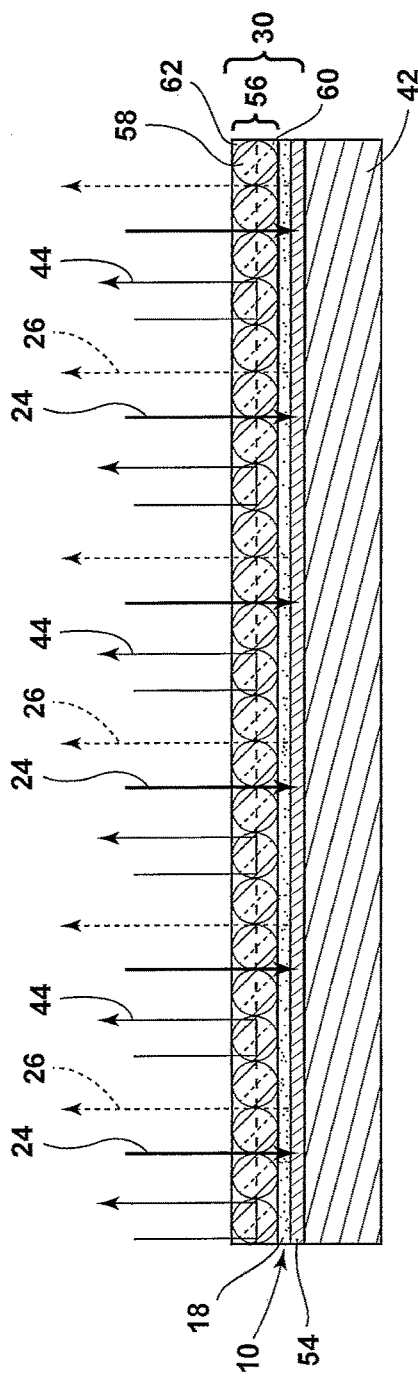
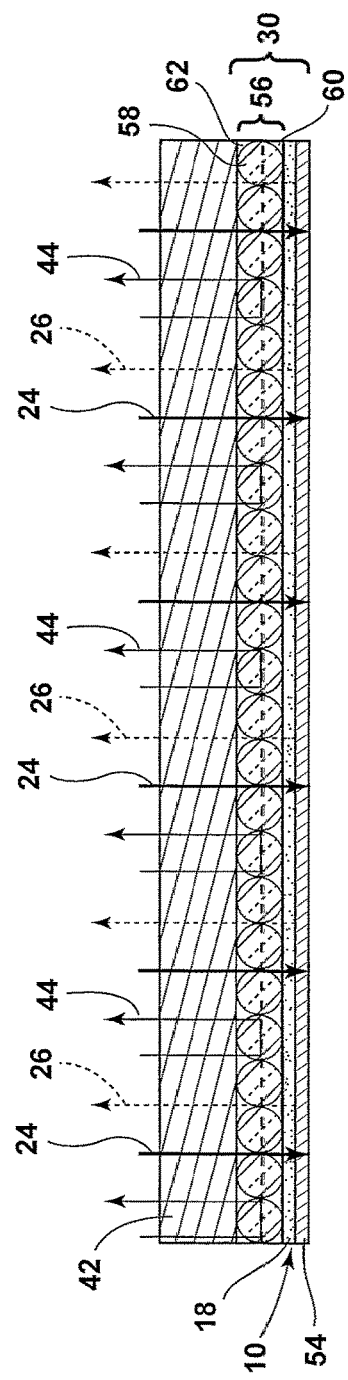
FIG. 5A
FIG. 5B

VEHICLE ILLUMINATION ASSEMBLY

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a vehicle reflective assembly is disclosed. The reflective assembly includes a lens and a housing attached to the lens. The lens includes a reflective assembly portion. A base layer having reflective characteristics is disposed on the lens in the reflective assembly portion. A photoluminescent structure is disposed on the base layer and is configured to luminesce in response to receiving an excitation light emitted by a light source. A reflective layer is disposed on the photoluminescent structure and has one or more reflective beads configured to reflect a first portion of incident light directed towards the reflective assembly portion and allow a second portion of the incident light to pass therethrough. The second portion of the incident light includes the excitation light therein.

According to another aspect of the present invention, a reflective assembly for a vehicle is disclosed. The reflective assembly includes a lens. A photoluminescent structure is disposed between a base layer and a reflective layer and is configured to luminesce in response to an excitation light. One or more reflective beads are disposed within the reflective layer.

According to yet another aspect of the present invention, a reflective assembly for a vehicle is disclosed. The reflective assembly includes a lens defining a reflective assembly portion. A reflective layer is configured to redirect a first portion of an incident light directed at the lens. A photoluminescent structure is disposed inwardly of the reflective layer and is configured to luminesce in response to receiving the excitation light. A base layer is disposed inwardly of the photoluminescent structure and is configured to substantially prevent light from passing therethrough.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 5A is a cross-sectional view taken along the line VA-VA of FIG. 4 illustrating an embodiment of the reflective assembly;

FIG. 5B is a cross-sectional view taken along the line VB-VB of FIG. 3 illustrating an alternate embodiment of the illumination assembly having the reflective assembly disposed on an inner surface of a lens;

DETAILED DESCRIPTION OF THE PREFERRED EMBODIMENTS

Figure 2:
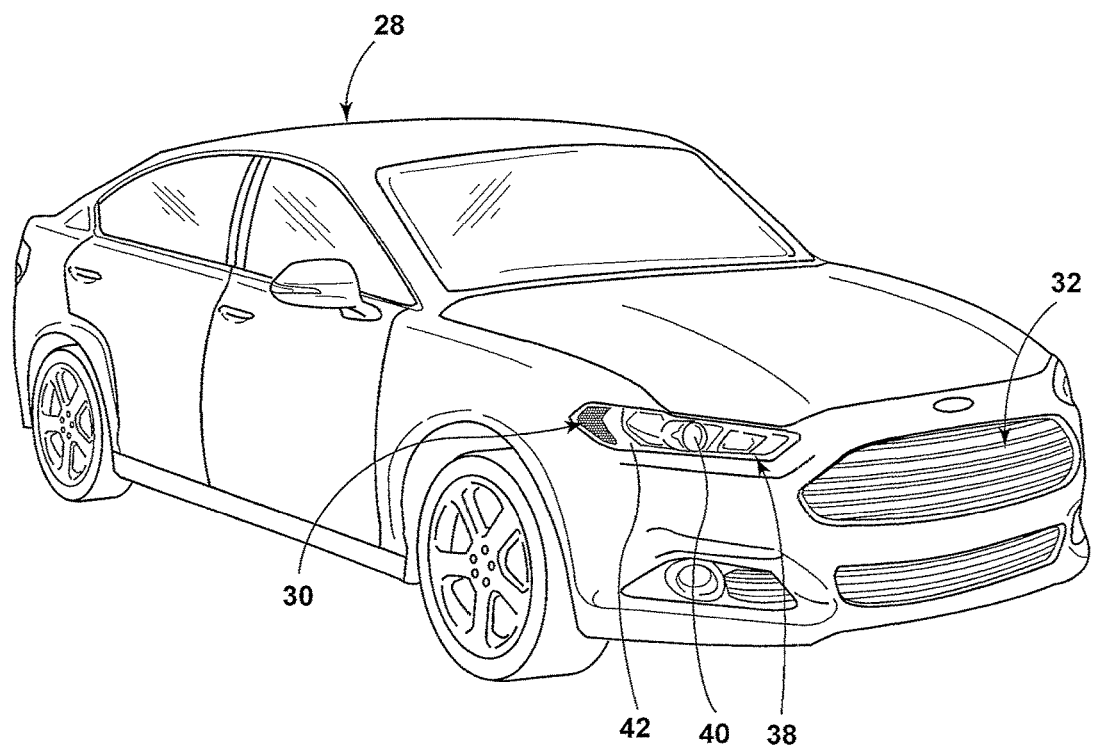
FIG. 2 is a front perspective view of a vehicle equipped with a reflective assembly, according to one embodiment.

For purposes of description herein, the terms "upper," "lower," "right," "left," "rear," "front," "vertical," "horizontal," "inward," "outward," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a reflective assembly for a vehicle. The illumination assembly may advantageously employ one or more photoluminescent structures that illuminate in response to pre-defined events. The one or more photoluminescent structures may be configured to receive an excitation light and re-emit a converted light at a different wavelength typically found in the visible wavelength spectrum. The converted light may be emitted from the photoluminescent structure for a substantial amount of time once the excitation light is removed.

Figure 1A:
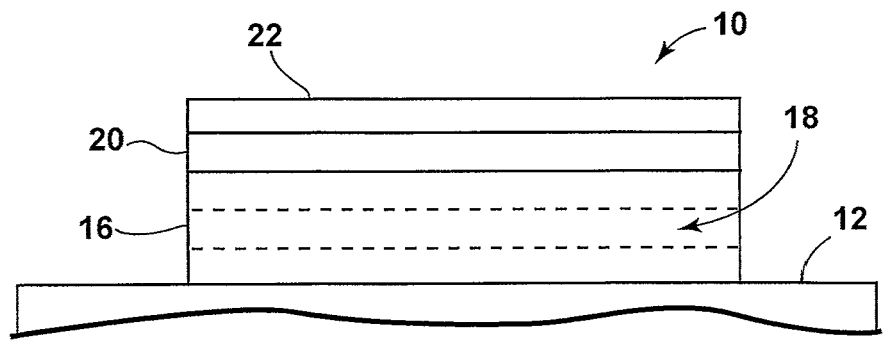
FIG. 1A is a side view of a photoluminescent structure rendered as a coating for use in a trim assembly according to one embodiment.
Figure 1B:
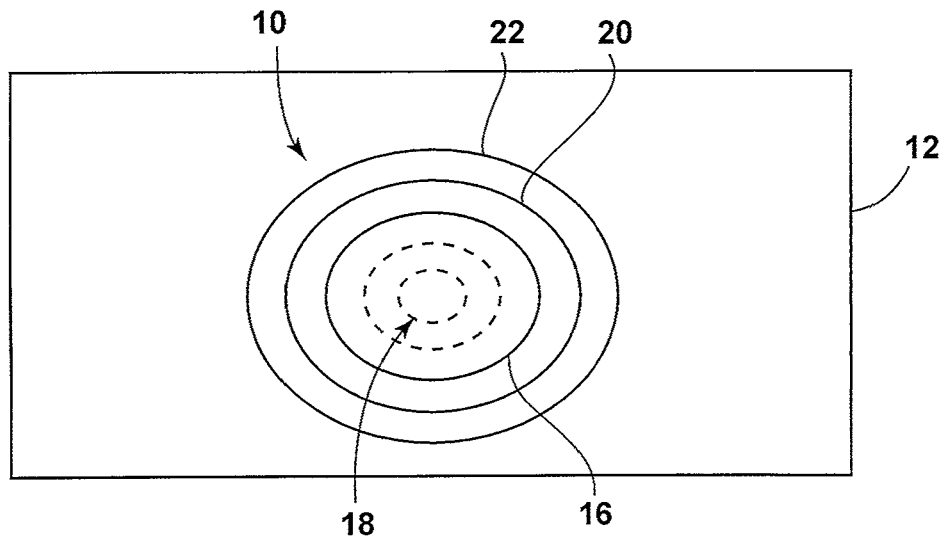
FIG. 1B is a top view of a photoluminescent structure rendered as a discrete particle according to one embodiment.
Figure 1C:
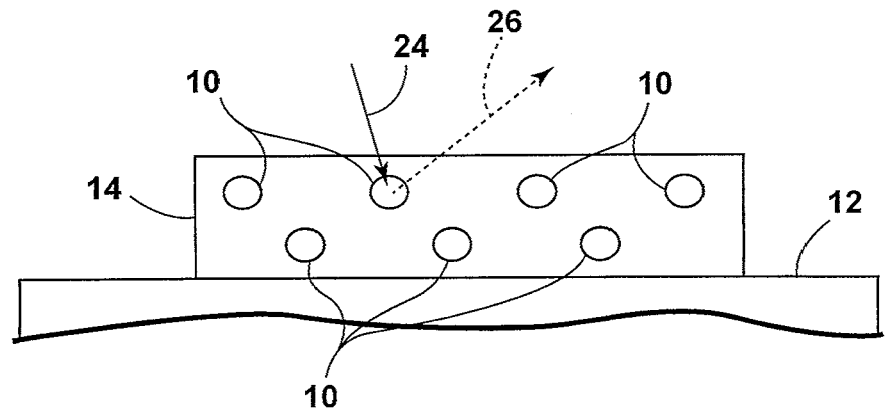
FIG. 1C is a side view of a plurality of photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 68 (FIG. 6A) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Pat. No. 8,846,184 to Agrawal et al., entitled "CHROMIC LUMINESCENT OBJECTS," all of which are incorporated herein by reference in their entirety.

According to one embodiment, the photoluminescent material 18 may include organic or inorganic fluorescent dyes including rylenes, xanthenes, porphyrins, and phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source 68. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source 68). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m$^2$ after a period of 10 minutes. Additionally, the long persistence photoluminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours).

Accordingly, the long persistence photoluminescent material 18 may continually illuminate in response to excitation from any light sources 68 that emits the excitation light 24, including, but not limited to, natural light sources (e.g., the sun) and/or any artificial light source 68. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m$^2$, or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of 2-8 hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PER- SISTENT ENERGY TRANSFER TECHNIQUE"; U.S. Pat. No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Figure 3:
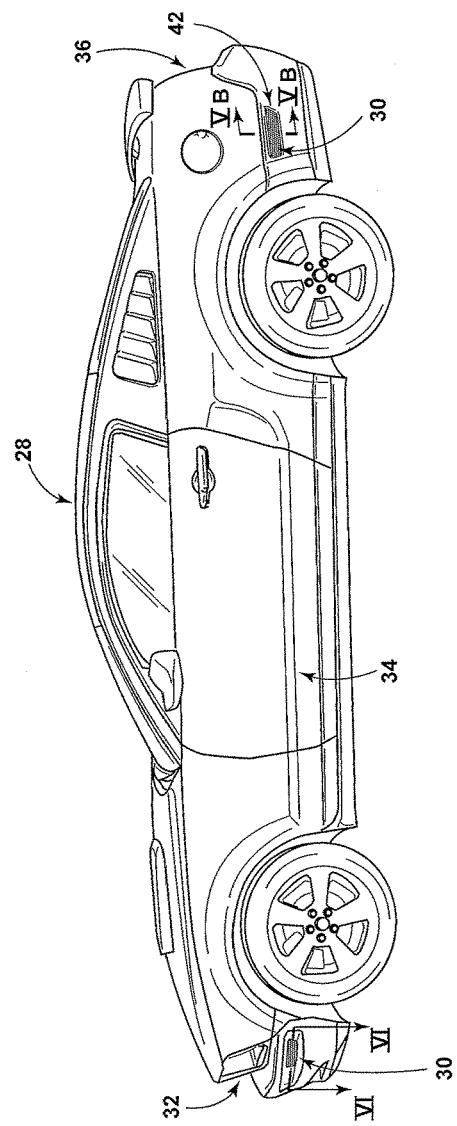
FIG. 3 is a side perspective view of the vehicle having the reflective assembly configured as a side marker, according to one embodiment.

Referring to FIGS. 2 and 3, a vehicle 28 such as a wheeled motor vehicle is shown having an exterior reflective assembly 30 disposed on a front portion 32 and an exterior side portion 34, respectively, as certain locations in the body structure. In other embodiments, the reflective assembly 30 may be located elsewhere on the body exterior, such as, but not limited to, other locations of the front portion 32, the side portions 34, and/or a rear portion 36 of the vehicle 28. Alternatively, the reflective assembly 30 may be disposed inside the vehicle 28. The reflective assembly 30 may be configured to render the vehicle 28 more noticeable by reflecting back to a viewer a portion of incident light 44 (FIG. 6A) impinging upon the reflective assembly 30.

With reference to FIG. 2, the reflective assembly 30 is shown disposed within and/or on a headlamp assembly 38 that includes one or more headlamps 40 therein. The headlamp assembly 38 further includes a lens 42. The lens 42 may be transparent or translucent and may wrap around an exterior portion of the vehicle 28 to extend from the forward portion of the vehicle 28 to the side portion 34 of the vehicle 28.

As illustrated in FIG. 2, the reflective assembly 30 is connected, or positioned adjacent, to the lens 42 and illuminates a luminesce. The reflective assembly 30 may be a government mandated feature for automotive vehicles, and may be referred to as a reflex reflector. As will be described in greater detail below, the reflective assembly 30 may accept incident light 44 and reflect light outwardly to illuminate. The incident light 44 may include excitation light 24 that causes the photoluminescent structure 10 to luminesce in response to receiving the excitation light 24. According to one embodiment, the reflective assembly 30 may have an amber, or orange color, appearance in the illuminated and/or unilluminated state.

With reference to FIG. 3, the reflective assembly 30 may be configured as an exterior side marker that notifies other drivers as to the location and size of the vehicle 28 during both daytime and nighttime driving. Side markers are generally mounted on the exterior body sides of a motor vehicle 28 to indicate to other drivers the presence and/or overall length of the vehicle 28. Additionally, or alternatively, the reflective assembly 30 may be configured as a clearance marker that is generally mounted on the front exterior portion 32 and the rear exterior portion of the vehicle 28 to indicate to other drivers the presence and/or the width of a vehicle 28.

According to one embodiment, the reflective assembly 30 may be configured to luminesce in response to receiving the excitation light 24. The luminescence exhibited by the reflective assembly 30 may provide one or more distinct lighting functions. The illumination may offer a unique, substantially uniform, and/or attractive viewing experience that may be difficult to duplicate through non-photoluminescent means. It will also be appreciated that the reflective assembly 30 described herein may be utilized for any vehicle 28 such as, but not limited to, coupes, sedans, trucks, sport utility, vans, and the like. Further, it will be appreciated that any lighting system found elsewhere on the vehicle 28 may also be manufactured in accordance with the principles of the present disclosure.

Figure 4:
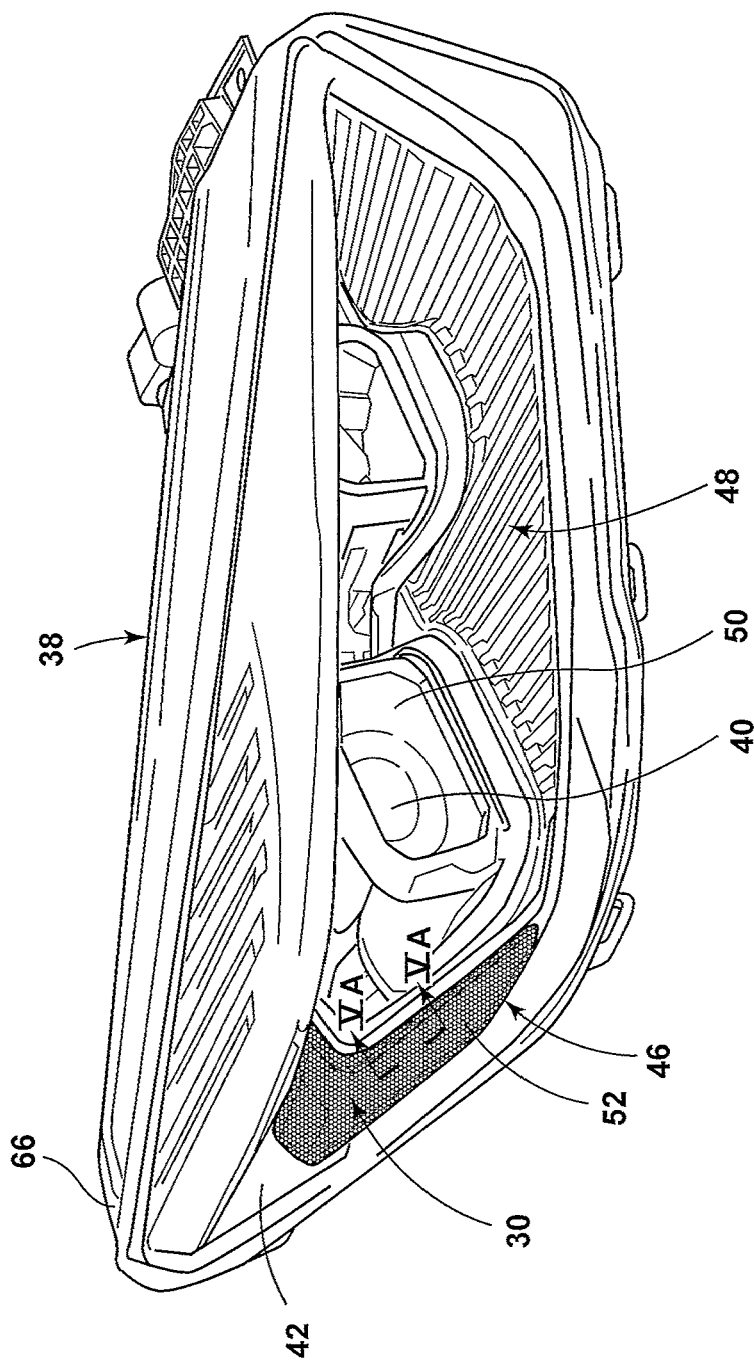
FIG. 4 is a perspective view of a headlamp assembly having the reflective assembly disposed thereon, according to one embodiment.

Referring to FIG. 4, the reflective assembly 30 is exemplarily shown disposed integrally within the headlamp assembly 38, according to one embodiment. The headlamp assembly 38 includes a housing 66 and a lens 42 that defines a viewable portion 46. A cavity 48 may be disposed between the lens 42 and the housing 66. The cavity 48 may be hollow and may include additional components therein, such as lights 40, reflectors 50, electrical connectors, and/or any other feature that may be desirable to install within the headlamp assembly 38. Each portion of the housing 66 and the lens 42 may be made of any practicable material, including, but not limited to, a polymeric material, an elastomeric material, a glass material, a metallic material, and/or a combination thereof.

The reflective assembly 30 may be disposed on a portion 52 of the lens 42. The reflective assembly portion 52, may be a separate lens that is capable of coupling to another lens, or may be an independent component. Alternatively, the reflective assembly portion 52 may be integrally formed with the lens 42. The reflective assembly portion 52 may be formed from a transparent or translucent material that may be colored any desired color (e.g., red, amber, etc.), or have portions thereof that are of different colors from one another. Portions of the lens 42 may also be provided with a textured, or non-planar, surface that may reflect, diffuse, and/or focus light through etching, molding, forming, or any other process known in the art.

According to one embodiment, the reflective assembly 30 may be attached or disposed on the headlamp assembly 38, or other substrate, and may have a thickness of less than 3 mm, which is significantly thinner than a standard reflex reflector that is commonly more the 5 mm wide. In some embodiments, the reflective assembly 30 may be equal to, or less than, 1 mm in thickness.

Referring to FIG. 5A, a cross section taken along the line VI-VI of FIG. 3 illustrates the reflective assembly 30 disposed on the lens 42, a base layer 54 disposed on the lens 42, the photoluminescent structure 10 disposed on the base layer 54, and a reflective layer 56 disposed on the photoluminescent structure 10.

The base layer 54 may be a solid component or a liquid carrier medium that is applied and/or coupled to the lens 42, according to one embodiment. When the base layer 54 is in the form of a liquid carrier medium, the base layer 54 may be applied to the lens 42 by painting, screen-printing, spraying, slot coating, dip coating, roller coating, and bar coating. Additionally, the base layer 54 may be applied through pad printing, which may offer a more cost effective process for applying the base layer 54 due to the ability to coat the lens 42 without the need for masking. In some embodiments, the material and constraints of the lens 42 upon which the base layer 54 is to be adhered may have a plasma treatment enacted thereon for better adherence of the base layer 54.

The base layer 54 may be configured to prevent any amount of incident light 44, which may correspond to the excitation light 24 and/or contain a portion of the excitation light 24 therein, that is directed from the environment proximate the reflective assembly 30 from entering the lens 42. Accordingly, the base layer 54 may include a light blocking material thereon. The light blocking material may absorb or reflect the incident light 44.

According to one embodiment, the base layer 54 may include a coating having a reflectance percentage of over 60%, and in some embodiments, the reflectance percentage may be greater than 90%. According to one embodiment, a coating containing $TiO_2$ may be utilized such that coating includes reflective characteristics and a refractive index above 2. However, in alternate embodiments, the reflective material in the base layer 54 may have any refractive index that is greater than, or equal to, 1. Further, it will be appreciated that the base layer 54 may have any level of reflectivity and may be made from any material known in the art having any reflective characteristics without departing from the scope of the present disclosure. As used herein, the term "reflective characteristics" is used to describe any material that is capable of reflecting any amount of light or other radiation that is directed at the material.

With further reference to FIG. 5A, the photoluminescent structure 10 is disposed on the base layer 54. Such methods may include preparing the photoluminescent structure 10 from a formulation in a liquid carrier medium and coating the base layer 54 and/or the lens 42 with the photoluminescent structure 10. The photoluminescent structure 10 may be applied to the base layer 54 by painting, screen-printing, spraying, slot coating, dip coating, roller coating, and bar coating, and/or any other method known in the art.

To accomplish a desired coloring of outputted light, an oil based tintable liquid carrier containing the photoluminescent structure 10 therein may be utilized and can be tinted a desired color with a small addition of standard tints or through addition of a second photoluminescent material 18. In some embodiments, government regulations dictate a tint color of the carrier medium.

A reflective layer 56 may be disposed above the photoluminescent structure 10. The reflective layer 56 may include clear, translucent, and/or opaque portions and may be colored any desired color. The reflective layer 56 may include any reflective material that generally functions to reflect incident light 44 that is directed from the environment proximate the reflective assembly 30 towards the viewable portion 46.

It will be appreciated that the reflective layer may be reflective and/or retroreflective. Accordingly, in embodiments where the reflective layer 56 has reflective properties, the incident light 44 may be spread, refracted, and/or scattered as the incident light 44 passes therethrough. In embodiments where the reflective layer 56 has retroreflective properties, the incident light 44 directed towards the reflective assembly 30 may redirect the incident light 44 in a substantially similar direction to the direction at which the incident light 44 approached the reflective assembly 30.

According to one embodiment, the reflective layer 56 is configured as a plurality of beads 58. The beads 58 may be formed from a glass material, a polymeric material, any other practicable material, and/or a combination thereof. The beads 58 may be reflective and/or retroreflective. Accordingly, the beads 58 and/or the photoluminescent structure 10 may spread, scatter, refract and/or reflect the incident light 44.

According to one embodiment, the refraction of incident light 44 may assist in eliminating some, or all, cases of solar focus by spreading, or scattering, the incident light 44 through the reflective assembly 30. Solar focus may occur when the incident light 44 is refracted through the lens 42 and is refracted again through a condenser lens. In some instances, the incident light 44 may refract again and exit the reflective assembly 30 through the condenser lens thereby focusing a substantial quantity of light rays to a single point on the reflective assembly 30. The single point may be on a bezel of the reflective assembly 30 and the focus incident light 44 may melt and/or degrade the bezel. Such a situation may be prevented by the usage of the beads 58 and/or photoluminescent structure 10, as described herein. Accordingly, the design of the reflective assembly 30 may be preserved without damage to any features of the reflective assembly 30 while still having improved reflective characteristics when compared to standard reflex reflectors.

In some embodiments, a portion of the beads 58 may be a first material (e.g., a glass) and a second portion of the beads 58 may be a second material (e.g., a polymeric material). The beads 58 may have a solid construction, or may be hollow. In embodiments where the beads 58 have a hollow core, the internal void may include any type of material, solid, liquid, or gas, without departing from the teachings provided herein. It will be appreciated that in alternate embodiments, reflective materials other than beads 58 may be utilized within the reflective layer 56 without departing from the teachings provided herein.

According to one embodiment, the material within the beads 58 may have a different refractive index than the material of the beads 58. The beads 58 may have a substantially spherical shape, an oblong shape, an irregular shape, or combinations thereof. The beads 58 may range in size from about 60 μm (0.0024 inches) to about 850 μm (0.034 inches). The bead size may be expressed in terms of U.S. Sieve number, or the size of mesh screen that a bead will pass through. For example, a U.S. Sieve Number 20 will permit beads 58 with a diameter of 840 μm (0.033 inches) or less to pass through the mesh, whereas a U.S. Sieve Number 200 mesh will allow those beads 58 of 74 μm (0.0029 inches) or less to pass. According to one embodiment, the beads 58 may be chosen from 20 to 200 U.S. Sieve Number. The beads 58, according to one embodiment, are substantially mono dispersed in size and/or shape. According to an alternate embodiment, the beads 58 may be configured in a variety of sizes and/or shapes that are randomly distributed within a light transmissive adhesive material 60.

According to one embodiment, the reflective layer 56 may contain over 10, 100 or 1000 beads 58 per square foot that are bonded to the photoluminescent structure 10, or any other component of the reflective assembly 30, within a light transmissive adhesive material 60. The beads 58 and/or adhesive material 60 may be printed onto the reflective assembly 30. Instead of scattering light, the beads 58 may reflect incident light 44 (e.g., ambient light) and redirect the incident light 44 away from the reflective assembly 30 thereby creating reflective characteristics. For the beads 58 to retroreflect light, the beads 58 may be partially transparent and substantially round. However, it will be understood that the beads 58 may be translucent and/or any other shape without departing from the scope of the present disclosure.

The transparency of the beads 58 may allow incident light 44, or ambient light, to pass into and be subsequently redirected out of the beads 58. As the incident light 44 enters the beads 58, it may be bent (refracted) by the rounded surface of the beads 58 to a point below where the beads 58 is embedded in the adhesive material 60. The incident light 44 striking the back of the beads 58 surface, which is embedded within the adhesive material 60, may then be reflected outwardly in a substantially convergent direction to which the incident light 44 entered the beads 58, with a fraction of the incident light 44 going back toward the photoluminescent structure 10. As discussed above, the incident light 44 may correspond to the excitation light 24, or contain a portion of excitation light 24 therein, thereby causing the photoluminescent structure 10 to luminesce.

The beads 58 may be applied to the photoluminescent structure 10 and/or any component of the reflective assembly 30 in a premixed solution, disposed into the wet adhesive material 60, dropped onto a premixed two-part epoxy or thermoplastic material, and/or through any other process known in the art. According to one embodiment, the beads 58 may be embedded to about greater than about 10%, 20%, 30%, 40%, 50% or 60% of the diameter of the beads 58. In other words, a portion of the beads 58 may protrude from the adhesive material 60. It will be understood that multiple contiguous layers of beads 58 may be utilized within the paint such that some beads 58 are completely surrounded by the adhesive material 60 while other beads 58 may protrude. Moreover, in some embodiments, the beads 58 may be encapsulated in the adhesive material 60. The depth of the beads 58 within the adhesive material 60 may be consistent across the reflective assembly 30 or may vary across the reflective assembly 30 such that certain areas are highlighted. In some embodiments, it may be desired to provide a consistent quality of both beads 58 and the adhesive material 60 to promote even retroreflectivity along the reflective assembly 30.

In some embodiments, when the incident light 44 is retroreflected, the retroreflected light 44 from the beads 58 may be a function of three variables including the index of refraction of the beads 58; the bead 58 shape, size, and surface characteristics; and the number of beads 58 present and exposed to incident light 44. The bead's 58 Refractive Index (RI) is a function of the chemical makeup of the beads 58. The higher the RI, the more incident light 44 that is retroreflected. According to one embodiment, the beads 58 disposed on the reflective assembly 30 have a refractive index in the range of 1 to 2.

The beads 58 may be disposed in an overmold material 62, which may be UV stable. The overmold material 62 may shield the photoluminescent structure 10 from the oxidizing action of the atmosphere and from moisture. According to one embodiment, the overmold material 62 may also contain a water based polyurethane resin. The polyurethane resin (e.g. an acrylic urethane resin) used in the overmold material 62 is a thermoplastic polymer derived or produced by the reaction of a polyisocyanate such as a diisocyanate (toluene diisocyanate) and a hydroxyl-containing material. The overmold material 62 may therefore prevent, reduce, or minimize the flaking of the exposed surface of the reflective assembly 30. The amount of water soluble polyurethane resin used ranges from about 3% to about 60%, by weight of the overmold material 62 composition, according to one embodiment.

In operation, according to one embodiment, the incident light 44 directed towards the reflective assembly 30 enters the reflective layer 56. A first portion of the incident light 44 is retroreflected by the reflective layer 56. A second portion of the incident light 44 may pass through the reflective layer 56 and enter the photoluminescent structure 10. The incident light 44 may correspond, or include the excitation light 24. The photoluminescent material 18 is formulated to become excited upon receiving excitation light 24 of a specific wavelength from any excitation source, such as the sun or any artificial light source 68. As a result, the excitation light 24 undergoes an energy conversion process and is re-emitted at a different wavelength as converted light 26. According to one embodiment, the photoluminescent material 18 may be formulated to convert excitation light 24 into a longer wavelength light, otherwise known as down conversion. Alternatively, the photoluminescent material 18 may be formulated to convert excitation light 24 into a shorter wavelength light, otherwise known as up conversion. Under either approach, light converted by the photoluminescent material 18 may be immediately outputted from the photoluminescent structure 10 or otherwise used in an energy cascade, wherein the converted light 26 serves as excitation light 24 to excite another formulation of photoluminescent material 18 located within the energy conversion layer 16, whereby the subsequent converted light 26 may then be outputted from the photoluminescent structure 10 or used as excitation light 24, and so on. With respect to the energy conversion processes described herein, the difference in wavelength between the excitation light 24 and the converted light 26 is known as the Stokes shift and serves as the principle driving mechanism for an energy conversion process corresponding to a change in wavelength of light.

In one embodiment, the energy conversion process is undertaken by way of down conversion, whereby the excitation light 24 includes light on the lower end of the visible spectrum such as blue, violet, or ultraviolet (UV) light. Doing so enables natural incident light 44, such as sun light, to be used as the excitation source. Accordingly, the reflective assembly 30 may produce a daytime luminescence, reflectivity, and/or coloration. In addition, the photoluminescent structure 10 may emit converted light 26 at night when light (i.e. head lights of an automobile) shine on the photoluminescent structure 10. Moreover, according to one embodiment, a long-persistence photoluminescent material 18 may be disposed within the photoluminescent structure 10 such that the reflective assembly 30 continues to emit light for long periods of time once excitation light 24 is no longer present. As discussed above, the long persistence photoluminescent material 18, according to one embodiment, may be operable to emit light at or above an intensity of 0.32 mcd/m$^2$ after a period of 10 minutes. Additionally, the long persistence photoluminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light source(s) 68 (FIG. 6A) that emits the excitation light 24, including, but not limited to, natural light sources (e.g., the sun) and/or any artificial light source 68. The periodic absorption of the excitation light 24 from any excitation source may provide for a substantially sustained charge of the long persistence photoluminescent material 18 to provide for consistent passive illumination.

The converted light 26 is emitted towards the reflective layer 56, where the converted light 26 is outputted from the reflective assembly 30. The converted light 26 is also emitted towards the base layer 54, which includes reflective characteristics such that light emitted thereto is redirected to the photoluminescent structure 10 and then through the reflective layer 56. Thus, according to one embodiment, the converted light 26 may be substantially prevented from passing through the base layer 54 and/or redirected by the base layer 54 in a desired direction.

Referring to FIG. 5B, a cross section of the reflective assembly 30 taken along the line VIB-VIB of FIG. 3 is shown having similar components to that of the reflective assembly 30 illustrated in FIG. 5A. Moreover, the assembly shown in FIGS. 5A and 5B may be used interchangeably on any location of the vehicle 28 without departing from the scope of the present disclosure.

As illustrated in FIG. 5B, the reflective layer 56 is disposed on an inner surface 64 of the lens 42. The photoluminescent structure 10 may then be disposed on the reflective layer 56. The base layer 54 may be applied to the photoluminescent structure 10 such that the base layer 54 is separated from the lens 42 by the reflective layer 56 and the photoluminescent structure 10.

According to one embodiment, the base layer 54 may have a metallic appearance that is applied through any method known in the art, including, but not limited to, sputter deposition, vacuum deposition (vacuum evaporation coating), electroplating, or directly printing onto the reflective assembly 30, or a component thereof, such as the photoluminescent structure 10. The metallic appearance may be chosen from a wide range of reflective materials and/or colors, including, but not limited to, silver, chrome, copper, bronze, gold, or any other metallic surface. Additionally, an imitator of any metallic material may also be utilized without departing from the teachings provided herein. Moreover, it will be appreciated that any other reflective material may alternatively be used to form and/or on the base layer 54 without departing from the scope of the present disclosure. It will be appreciated that the base layer 54 may include one or more materials therein. Any number of the one or more materials may have reflective characteristics.

Figure 6A:
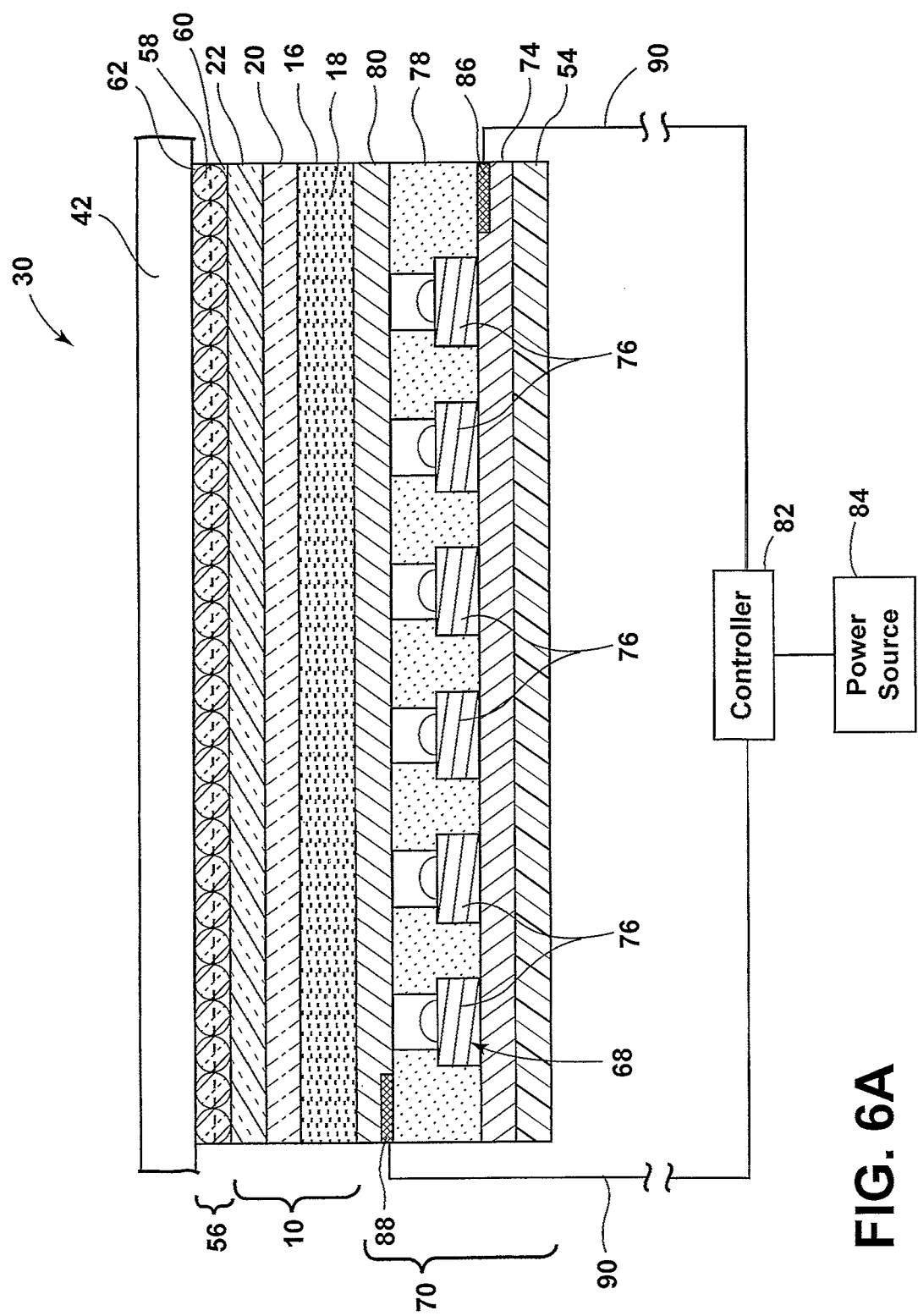
FIG. 6A is a cross-sectional view taken along line VI-VI of FIG. 3 illustrating a light source according to one embodiment.

Referring to FIG. 6A, a cross-sectional view of an alternate embodiment of the reflective assembly 30 taken along the line VI-VI of FIG. 3 is shown. It is to be understood that any reflective assembly 30 on the vehicle 28 may be assembled in a similar fashion. As illustrated in FIG. 6A, the reflective assembly 30 includes a light source 68 that may have a stacked arrangement and includes a light-producing assembly 70 disposed between the photoluminescent structure 10 and the base layer 54.

The light-producing assembly 70 may correspond to a thin-film or printed light emitting diode (LED) assembly and includes a base layer 54 as its lowermost layer. The base layer 54 may include a polycarbonate, poly-methyl methacrylate (PMMA), polyester, polypropylene, or polyethylene terephthalate (PET) material, or any other practicable material, on the order of 0.005 to 0.060 inches thick. Alternatively, as a cost saving measure, the base layer 54 may correspond to any preexisting vehicle structure (i.e., any substrate within the vehicle 28 or disposed on an exterior portion of the vehicle 28) and may be formed of any practicable material, including a glass filled polymeric material.

The light-producing assembly 70 also includes a positive electrode 74 arranged over the base layer 54. The positive electrode 74 includes a conductive epoxy such as, but not limited to, a silver-containing or copper-containing epoxy. The positive electrode 74 is electrically connected to at least a portion of a plurality of LED sources 76 arranged within a semiconductor ink 78 and applied over the positive electrode 74. Likewise, a negative electrode 80 is also electrically connected to at least a portion of the LED sources 76. The negative electrode 80 is arranged over the semiconductor ink 78 and includes a transparent or translucent conductive material such as, but not limited to, indium tin oxide. Additionally, each of the positive and negative electrodes 74, 80 are electrically connected to a controller 82 and a power source 84 via a corresponding bus bar 86, 88 and conductive leads 90. The bus bars 86, 88 may be printed along opposite edges of the positive and negative electrodes 74, 80 and the points of connection between the bus bars 86, 88 and the conductive leads 90 may be at opposite corners of each bus bar 86, 88 to promote uniform current distribution along the bus bars 86, 88.

The LED sources 76 may be dispersed in a random or controlled fashion within the semiconductor ink 78 and may be configured to emit focused or non-focused light toward the photoluminescent structure 10. The LED sources 76 may correspond to micro-LEDs of gallium nitride elements on the order of 5 to 400 microns in size and the semiconductor ink 78 may include various binders and dielectric material including, but not limited to, one or more of gallium, indium, silicon carbide, phosphorous, and/or translucent polymeric binders. In this manner, the semiconductor ink 78 may contain various concentrations of LED sources 76 such that the density of the LED sources 76 may be adjusted for various lighting applications.

The semiconductor ink 78 can be applied through various printing processes, including ink jet and silkscreen processes to selected portion(s) of the positive electrode 74. Thus, it is envisioned that the LED sources 76 are dispersed within the semiconductor ink 78, and shaped and sized such that a substantial quantity of the LED sources align with the positive and negative electrodes 74, 80 during deposition of the semiconductor ink 78. The portion of the LED sources 76 that ultimately are electrically connected to the positive and negative electrodes 74, 80 may be illuminated by a combination of the bus bars 86, 88, controller 82, power source 84, and conductive leads 90. According to one embodiment, the power source 84 may correspond to a vehicular power source operating at 12 to 16 VDC. Additional information regarding the construction of light-producing assemblies is disclosed in U.S. Pat. No. 9,299,887 to Lowenthal et al., entitled "ULTRA-THIN PRINTED LED LAYER REMOVED FROM SUBSTRATE," the entire disclosure of which is incorporated herein by reference.

Referring still to FIG. 6A, the photoluminescent structure 10 is arranged over the negative electrode 80 as a coating, layer, film or other suitable deposition. With respect to the presently illustrated embodiment, the first photoluminescent structure 10 may be arranged as a multi-layered structure including the energy conversion layer 16, optional stability layer 20, and optional protective layer 22, as described above. The photoluminescent structure 10 may contain a long persistent photoluminescent material 18.

The reflective layer 56 is disposed over the photoluminescent structure 10 and may be at least partially light transmissible. In this manner, the reflective layer 56 may be illuminated by the photoluminescent structure 10 or the light-producing assembly 70 when the LED sources 76 are illuminated.

The lens 42 may be disposed over the reflective layer 56. By disposing the lens 42 over the photoluminescent structure 10, it may also function to protect the photoluminescent structure 10 and the light-producing assembly 70. The lens 42 may be arranged in a planar shape and/or an arcuate shape to enhance its viewing potential. The size and shape of the lens 42 and/or reflex assembly portion 52 may be driven by a desired sweep/rake angle and/or any regulatory requirements for the desired market of the reflective assembly 30. For example, the design choices made may be chosen in conjunction with the requirements set forth in United Nations Economic Commission for Europe (ECE) Regulation No. 48, Federal Motor Vehicle Safety Standards Section 108, and/or any other regulation.

Figure 6B:
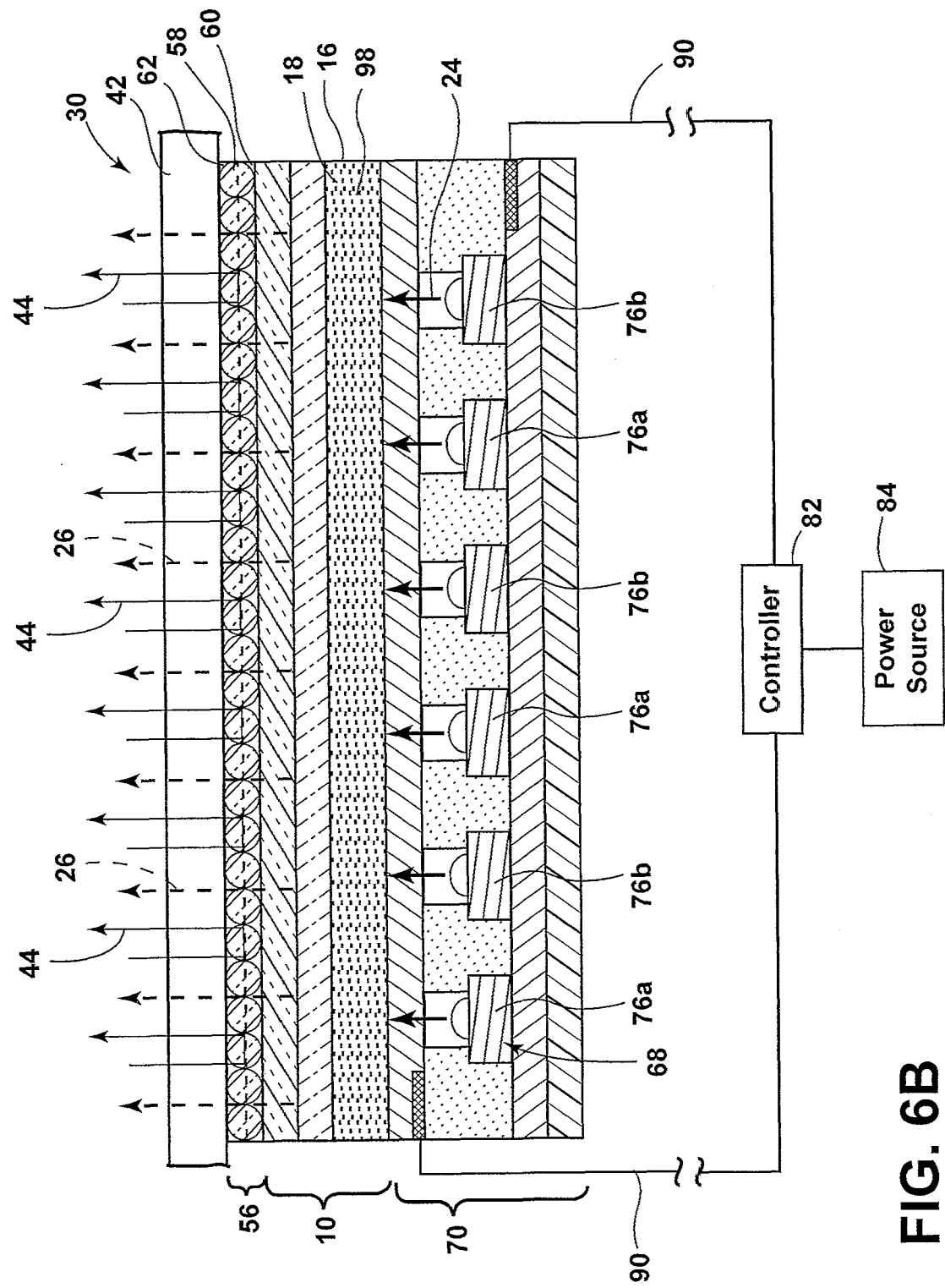
FIG. 6B is a cross-sectional view taken along line VI-VI of FIG. 3 further illustrating the light source, according to one embodiment.

Referring to FIG. 6B, an energy conversion process for generating multiple colors of light is illustrated according to one embodiment. For consistency, the energy conversion process is also described below using the reflective assembly 30 depicted in FIG. 6A. In this embodiment, the energy conversion layer 16 includes two different photoluminescent materials 18, 98. Alternatively, the photoluminescent materials 18, 98 may be isolated from each other if desired. Also, it should be appreciated that the energy conversion layer 16 may include more than two different photoluminescent materials, in which case, the teachings provided below similarly apply. In one embodiment, the energy conversion process occurs by way of down conversion using blue, violet, and/or UV light as the source of excitation.

With respect to the presently illustrated embodiment, the excitation of photoluminescent materials 18 and 98 are mutually exclusive. That is, photoluminescent materials 18 and 98 are formulated to have non-overlapping absorption spectrums and Stoke shifts that yield different emission spectrums. Also, in formulating the photoluminescent materials 18, 98, care should be taken in choosing the associated Stoke shifts such that the converted light 26 emitted from one of the photoluminescent materials 18, 98 does not excite the other, unless so desired.

According to one exemplary embodiment, a first portion of the LED sources 76, exemplarily shown as LED sources 75A, is configured to emit an excitation light 24 having an emission wavelength that only excites photoluminescent material 18 and results in the excitation light 24 being converted into a visible light of a first color. Likewise, a second portion of the LED sources 76, exemplarily shown as LED sources 75B, is configured to emit an excitation light 24 having an emission wavelength that only excites photoluminescent material 98 and results in the excitation light 24 being converted into a visible light of a second color.

Preferably, the first and second colors are visually distinguishable from one another. In this manner, LED sources 75A and 75B may be selectively activated using the controller 82 to cause the photoluminescent structure 10 to luminesce in a variety of colors. For example, the controller 82 may activate only LED sources 75A to exclusively excite photoluminescent material 18, resulting in the lens 42 illuminating in the first color. Alternatively, the controller 82 may activate only LED sources 75B to exclusively excite photoluminescent material 98, resulting in the lens 42 illuminating in the second color. Alternatively still, the controller 82 may activate LED sources 75A and 75B in concert, which causes both of the photoluminescent materials 18, 98 to become excited, resulting in the lens 42 illuminating in a third color, which is a color mixture of the first and second color. For energy conversion layers 16 containing more than two distinct photoluminescent materials, a greater diversity of colors may be achieved. Contemplated colors include red, green, blue, and combinations thereof including white, all of which may be achieved by selecting the appropriate photoluminescent materials and correctly manipulating their corresponding LED sources.

Accordingly, a reflective assembly for a vehicle has been advantageously described herein. The assembly may provide various benefits including a simple and cost-effective means to produce a variety of illumination features that may be used as a styling feature and/or to provide active and/or passive exterior lighting to the vehicle.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle reflective assembly, comprising:
   a lens and a lamp housing attached to the lens, wherein the lens includes a reflective assembly portion;
   a base layer having reflective characteristics disposed on the lens in the reflective assembly portion;
   a photoluminescent structure disposed on the base layer and configured to luminesce in response to receiving an excitation light emitted by a light source; and
   a reflective layer disposed on the photoluminescent structure having one or more reflective beads configured to reflect a first portion of incident light directed towards the reflective assembly portion and allow a second portion of the incident light to pass therethrough, wherein the second portion of the incident light includes the excitation light therein.

2. The vehicle reflective assembly of claim 1, wherein the photoluminescent structure includes at least one photoluminescent material configured to convert an excitation light received from the second portion of the incident light into a visible light.

3. The vehicle reflective assembly of claim 1, wherein the first photoluminescent structure includes a long persistent photoluminescent material therein.

4. The vehicle reflective assembly of claim 1, wherein the photoluminescent structure is part of a medium that includes reflective characteristics such that the lens is reflective when the photoluminescent structure is not illuminated and emits converted light of a desired color when the photoluminescent structure receives the excitation light.

5. The vehicle reflective assembly of claim 1, wherein the excitation light comprises one of blue light, violet light, and UV light.

6. The vehicle reflective assembly of claim 1, further comprising:
 an adhesive layer, wherein the beads may be embedded within the adhesive layer.

7. The vehicle reflective assembly of claim 6, wherein the adhesive layer is partially light transmissive such that the incident light may pass therethrough.

8. A reflective assembly for a vehicle, comprising:
 a lens disposed on a lamp assembly of the vehicle;
 a photoluminescent structure disposed on the lens between a base layer and a reflective layer and configured to luminesce in response to an excitation light; and
 one or more reflective beads disposed within the reflective layer.

9. The reflective assembly for a vehicle of claim 8, wherein the photoluminescent structure includes a long persistent photoluminescent material therein.

10. The reflective assembly for a vehicle of claim 8, wherein the first photoluminescent structure comprises at least one photoluminescent material configured to convert an excitation light into a visible converted light that is outputted to a viewable portion.

11. The reflective assembly for a vehicle of claim 10, wherein the excitation light comprises one of blue light, violet light, and UV light.

12. The reflective assembly for a vehicle of claim 8, wherein the lens is configured as a side marker for a vehicle.

13. The reflective assembly for a vehicle of claim 9, wherein the lens is also configured to output a light emitted from a headlamp.

14. The reflective assembly for a vehicle of claim 9, wherein the reflective beads are maintained within and protrude from an adhesive material.

15. A reflective assembly for a vehicle, comprising:
 a lens defining a reflective assembly portion on a lamp of the vehicle;
 a reflective bead layer disposed on the lens and configured to redirect an incident light directed at the lens;
 a photoluminescent structure disposed inwardly of the reflective layer; and
 a base layer disposed inwardly of the photoluminescent structure and configured to substantially prevent light from passing therethrough.

16. The reflective assembly for a vehicle of claim 15, wherein an excitation light is supplied from a natural light source.

17. The reflective assembly for a vehicle of claim 15, wherein an excitation light is supplied from an artificial light source.

18. The reflective assembly for a vehicle of claim 15, wherein the base layer includes $TiO_2$ and has a reflectance percentage greater than 90%.

19. The reflective assembly for a vehicle of claim 15, wherein a converted light outputted from the photoluminescent structure is emitted towards the base layer and the reflective layer, wherein the converted light emitted towards the base layer is redirected to the photoluminescent structure and then through the reflective layer.

20. The reflective assembly for a vehicle of claim 19, wherein the base layer is formed through vapor metal deposition of the reflective assembly portion of the lens.

* * * * *